Figure 1:
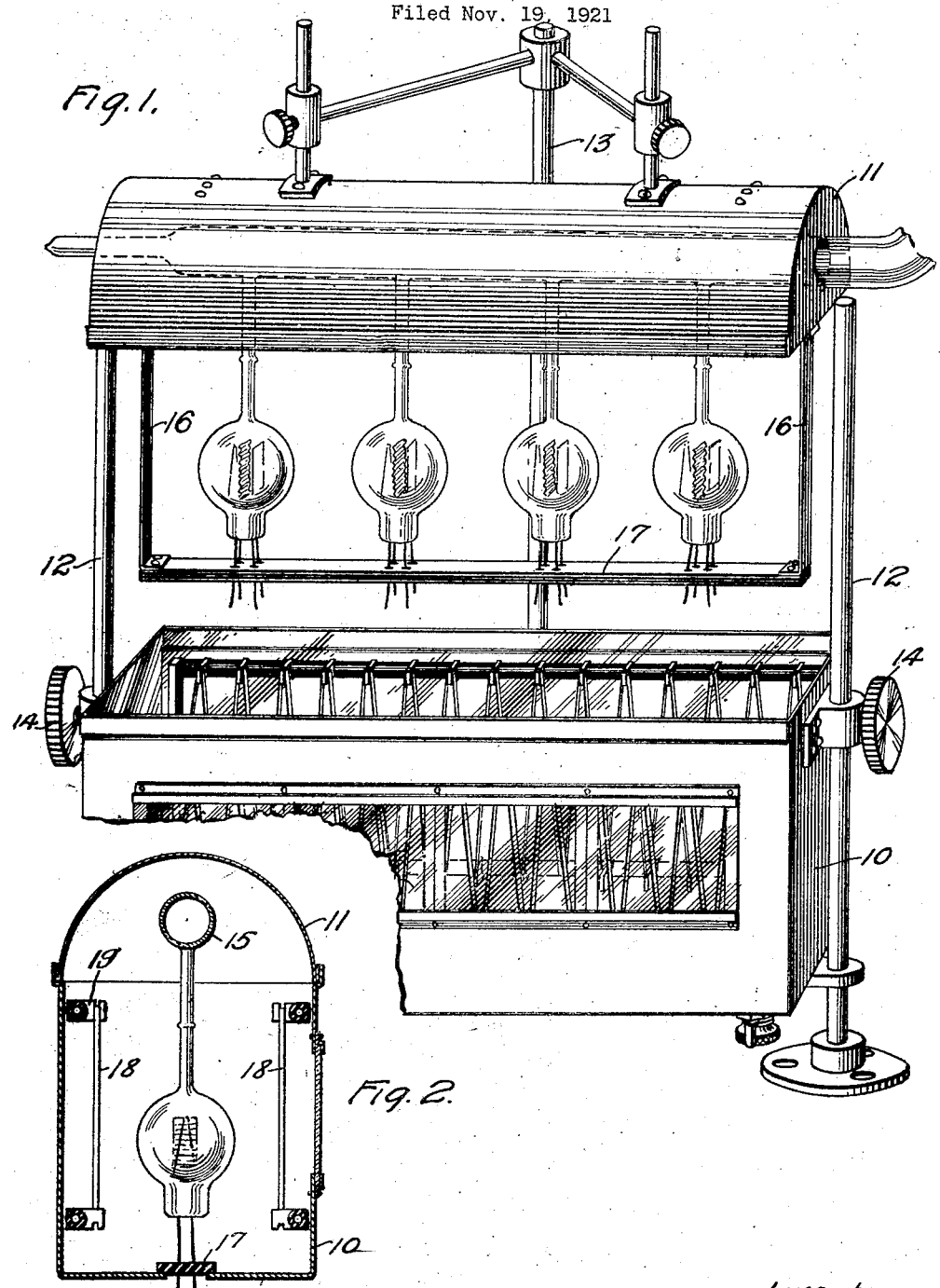

March 30, 1926.  
F. L. HUNTER  
ELECTRIC OVEN  
Filed Nov. 19, 1921  
1,578,662

Inventor:
Frederick L. Hunter,
by C. G. Sprague, Atty.

Patented Mar. 30, 1926.

1,578,662

UNITED STATES PATENT OFFICE.

FREDERICK L. HUNTER, OF EAST ORANGE, NEW JERSEY, ASSIGNOR TO WESTERN ELECTRIC COMPANY, INCORPORATED, OF NEW YORK, N. Y., A CORPORATION OF NEW YORK.

ELECTRIC OVEN.

Application filed November 19, 1921. Serial No. 516,308.

*To all whom it may concern:*

Be it known that I, FREDERICK L. HUNTER, a citizen of the United States, residing at East Orange, in the county of Essex, State of New Jersey, have invented certain new and useful Improvements in Electric Ovens, of which the following is a full, clear, concise, and exact description.

This invention relates to the exhaustion of vacuum vessels and pertains more especially to an oven for heating vacuum tubes during the pumping thereof.

The object of this invention is a simple and inexpensive oven capable of quickly and efficiently heating the electrodes of a vacuum tube during the exhaust thereof.

Ovens heretofore used for heating vacuum tubes during exhaustion have comprised casings lined with heat insulating material. The heat capacity of these ovens is quite large, and in order to bring them up to the desired temperature without a considerable waste of time it was necessary to make the initial power input of considerably greater value than was needed to maintain the oven at the desired temperature. Then after the desired temperature had been obtained it was necessary to reduce the power input to that needed to maintain the ovens at the desired temperature. It has also been necessary when using these ovens to heat vacuum tubes to be exhausted for a considerable time with the interior of the tubes in communication with the atmosphere, in order to allow the electrodes to be raised to the desired temperature by heat transmitted from the heating element to the wall of the tube and from the wall of the tube to the electrodes by convection.

This invention provides a low heat capacity oven casing, the interior of which is a good reflector of heat, and a pair of heating elements arranged a short distance from the side walls of the oven. Because of the low heat capacity of the oven, only a slight amount of the initial power input is absorbed by the oven and the remainder of the power input quickly heats up the oven to the temperature at which the heat radiated from the exterior of the oven equals the power input. It is unnecessary to regulate the power input until it is desired to shut off the oven. The heat radiated from the heating elements directly toward the vacuum tube together with that radiated toward it by reflection from the walls is sufficient to heat the electrodes almost immediately to the desired temperature. As radiated heat passes through a vacuum as easily as through the atmosphere, the above described arrangement allows the exhaustion of the tubes to be begun simultaneously with the starting of the oven and, therefore, greatly reduces the time spent in the pumping operation.

The invention further insures that the tubes are entirely free of all moisture when they are sealed off. This is accomplished by enclosing the header to which the tubulatures of the vacuum tubes are attached within the top wall of the oven. Thus, the moisture removed from the tubes is driven beyond the header and there is no possibility of any moisture being retained within the tubes.

Figure 2:
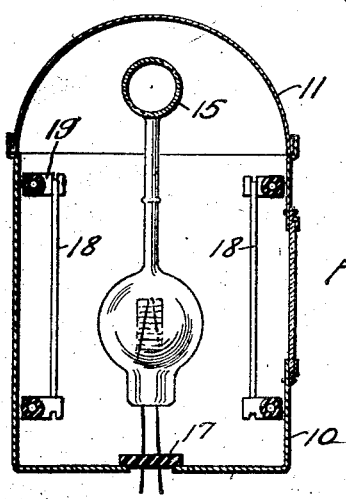

Other objects and advantages of the invention will be apparent from the following specification and accompanying drawing wherein Fig. 1 is a side elevation of the oven in its open condition and Fig. 2 is a transverse vertical section of the oven when closed.

The oven comprises a lower box-like portion 10 and a substantially semi-cylindrical cover 11. The longitudinal upper edges of the box 10 are offset to allow the cover to fit within the top of the box. The box 10 is supported by means of standards 12 and the cover by means of the standard 13. The box 10 is adjustable up and down on the standards 12 and is held in any desired position by the set screws 14. The header 15 of the pumping apparatus is arranged within and supported by the cover 11. Depending from each end of the cover 11 is a strap 16. The straps 16 are connected at their lower ends by a strip 17 of insulating material in which are provided apertures for the lead wires of the tube to be exhausted. The bottom wall of the oven is longitudinally slotted along the center line in order to allow the lead wires of the tubes being exhausted to extend out of the casing. This slot is normally closed by the strip 17. The tubes to be exhausted are suspended from the header 15 by their tubulatures and are arranged along the longitudinal center of the casing. Arranged in the box 10, near the side walls thereof, are the heating elements 18. Each element 18 preferably comprises a frame 19 from which is supported a grid-like resistance member which is made of a metallic ribbon, the edges of which are directed toward the tubes to be evacuated and toward one side wall of the casing. The casing is free of heat obstructing or heat absorbing material.

The box 10 and the cover 11 are formed of or lined with a material which is a good reflector of heat waves, such for example as highly polished aluminum, nickel and the like. The walls of the box and cover are quite thin and of low heat capacity. The small heat capacity of the casing allows practically all of the initial power input to be utilized in heating the interior of the oven so that it is quickly raised to the desired temperature without increasing the power input beyond that necessary to maintain the oven at the proper temperature. It is thus possible to put a definite amount of power into the oven which will quickly heat it to and maintain it at the desired temperature without regulation.

The heat waves radiated from the resistance element directly toward the tube and those reflected toward the tube from the inner surfaces of the casing serve to heat the electrodes to the temperature necessary to drive off the absorbed gases. As heat waves are effectively transmitted through the medium of the ether of an evacuated space, the heat need not be applied until the evacuation of the tube is started or is partially completed. The design of the cover 11 is such that the waves radiated from the flat surface of the resistance ribbon are reflected toward the tubes. The arrangement of the header 15 within the top wall of the oven insures that all moisture within the tubes will be driven sufficiently far into the pumping apparatus that there will be no danger of any moisture being left in the tube after evacuation.

It is obvious that other means may be used for supplying energy through the ether in the evacuated bulb for heating the electrodes without departing in any wise from the spirit of the invention as set forth in the appended claims.

What is claimed is:

1. An electric oven comprising a casing substantially free of heat absorbing material, said casing being composed of heat reflecting material, and a source of heat arranged within said casing but spaced from the wall thereof.

2. An electric oven comprising a casing substantially free of heat absorbing material and having a heat reflecting surface, and a grid-like source of heat arranged within said casing but spaced from the wall thereof.

3. An electric oven comprising a casing, a cover for said casing, said cover being adapted to receive the header of an evacuating device, and a source of heat arranged within said casing but spaced from the wall thereof.

4. An electric oven comprising a casing, a substantially semi-cylindrical cover for said casing, said cover being adapted to receive the header of an evacuating device, and a source of heat arranged within said casing.

5. An electric oven comprising a casing, a cover for said casing, said casing being movable relative to said cover, means within the cover to support a vacuum tube to be exhausted, and a source of heat within said casing.

6. An electric oven comprising a casing having a slot, a cover for said casing movable relative to said casing, means within the cover to support a vacuum tube to be exhausted, a source of heat within said casing, and means supported by said cover to close said slot.

7. An electric oven comprising a casing composed of a single layer of sheet metal whereby the heat capacity of said oven is low, the inner wall of said casing presenting a heat reflecting surface, and a source of heat arranged within said casing but spaced from the wall thereof.

8. An electric oven comprising a casing, a cover for said casing adapted to receive the header of an evacuating device, said cover and casing being of low heat capacity and having a heat reflecting interior surface, and a source of heat arranged within said casing.

9. An electric oven comprising a casing, a cover for said casing, said cover and casing being of low heat capacity and having a heat reflecting interior surface, means for supporting said cover and casing in movable relation to each other, means within the cover to support a vacuum tube to be exhausted, and a source of heat within said casing.

10. An electric oven comprising a casing, a cover for said casing, said casing and cover being of low heat capacity and having a heat reflecting interior surface, and means for supporting said cover and casing in shiftable relation.

11. An electric oven comprising a casing having a slot, a cover for said casing, said casing being movable relative to said cover, said cover and casing being of low heat capacity and having a heat reflecting interior surface, means within the cover to support a vacuum tube to be exhausted, a source of heat within said casing, and means supported by said cover to close said slot.

12. An electric oven comprising a casing of low heat capacity composed of a single layer of sheet metal having a heat reflecting interior surface, and a heating unit arranged adjacent to but spaced from said surface.

13. An electric oven comprising a low heat capacity casing composed of a single layer of sheet metal having a heat reflecting interior surface, a frame arranged substantially parallel to a wall of said casing but spaced from the wall thereof, and a heating unit supported by said frame.

14. An electric oven comprising a low heat capacity casing composed of a single layer of sheet metal having a heat reflecting inner surface, and a source of heat arranged within said casing but spaced from the wall thereof.

In witness whereof, I hereunto subscribe my name this 10th day of November A. D., 1921.

FREDERICK L. HUNTER.